United States Patent [19]

Li et al.

[11] Patent Number: 5,443,614
[45] Date of Patent: Aug. 22, 1995

[54] DIRECT SMELTING OR ZINC CONCENTRATES AND RESIDUES

[75] Inventors: Rui-Quing Li, Pointe-Claire; John G. Peacey, Lancaster, both of Canada

[73] Assignee: Noranda, Inc., Toronto, Canada

[21] Appl. No.: 281,609

[22] Filed: Jul. 28, 1994

[51] Int. Cl.$^6$ .................. C22B 7/02; C22B 19/04
[52] U.S. Cl. .................. 75/10.29; 75/10.3; 75/636; 75/658; 75/669; 75/670
[58] Field of Search .......... 75/10.29, 10.3, 10.31, 75/10.32, 658, 659, 660, 661, 662, 636, 669, 670, 961

[56] References Cited

U.S. PATENT DOCUMENTS

| | | | |
|---|---|---|---|
| 4,514,221 | 4/1985 | Goto | 75/63 |
| 5,131,944 | 7/1992 | Malmström et al. | 75/655 |
| 5,178,667 | 1/1993 | Kemori et al. | 75/658 |
| 5,196,047 | 3/1993 | Aune | 75/10.3 |

FOREIGN PATENT DOCUMENTS

| | | | |
|---|---|---|---|
| 2096665 | 11/1993 | Canada | C22B 7/00 |
| 697765 | 9/1953 | United Kingdom | 75/10.32 |
| 2048309 | 12/1980 | United Kingdom | C22B 5/02 |
| 9108317 | 6/1991 | WIPO | C22B 19/04 |

OTHER PUBLICATIONS

Asteljoki et al., "*Production of zinc by flash smelting of calcined concentrates*", in Extraction Metallurgy '89 Symposium, London, Jul. 10–13, 1989.

Yazawa, "*Thermodynamic evaluatons of extractive metallurgical processes*", in Metallurgical Transactions B, 1979, vol. 10B, 307–321.

Davey et al., "*The direct smelting of zinc sulphide concentrate*", in the proceedings of Australia/Japan Extractive Metallurgy Symposium, Sydney, Jul. 16–19, pp. 23–29 1980.

Kellogg, "*Energy use in zinc extraction*", in the proceedings of the World symposium on metallurgy and environmental control, Las Vegas, Feb. 24–28, 1980, pp. 28–47.

*Primary Examiner*—Melvyn Andrews
*Attorney, Agent, or Firm*—Fitzpatrick, Cella, Harper & Scinto

[57] ABSTRACT

The present invention is concerned with a process for the direct smelting of zinc containing materials. The process includes volatilizing zinc from zinc-containing materials into a gas phase, while sulphur is fixed as iron sulphide in a Fe-S-O matte. Thereafter, zinc is recovered in metallic form with a suitable condenser apparatus from a zinc laden gas consisting of Zn(g), CO, $CO_2$ and $N_2$. Other metals like silver, cadmium, mercury and lead may also be recovered in this manner.

19 Claims, 6 Drawing Sheets

DIRECT SMELTING OR ZINC CONCENTRATES AND RESIDUES

FIELD OF THE INVENTION

The present invention is concerned with a process for direct smelting of zinc sulphide concentrates with varying amounts of zinc-iron residues in a molten iron-sulphur bath heated by the combustion of carbonaceous fuels or electrical power.

BACKGROUND OF THE INVENTION

Zinc is mainly produced by a roast-leach-electrowinning process route, which accounts for about 80% of the world primary zinc production. This process produces high quality zinc with very high zinc recovery (>95%) but suffers from the several major drawbacks: (1) it uses electricity as reductant, hence its operating cost is high; (2) it produces iron containing leach residue either as jarosite or goethite, whose disposal poses an increasing environmental problem; (3) the elimination of sulphur from concentrate takes the form of sulphur dioxide necessitating the production of sulphuric acid which finds an increasingly limited market; (4) the process is not amenable to the treatment of secondary zinc feed materials containing high impurity levels, such as electric arc furnace dusts from the steel industry and other complex sources.

The so-called Imperial Smelting Furnace (ISF) process is the major pyrometallurgical process to treat zinc-lead concentrate. The advantage of this process over the electrolytic zinc process is its flexibility in treating high-lead, bulk concentrates with high recoveries of lead, copper and precious metals. However, this is a two-stage process involving sintering of Zn-Pb concentrates followed by blast furnace reduction. The process suffers from the need for large amounts of high-quality coke and sinter, which contribute to a large portion of the capital cost and results in serious environmental problems.

Increasing efforts have been made in developing new pyrometallurgical processes that can solve the above mentioned problems associated with the existing processes, especially in Japan, Australia and Europe, where the cost of electric power is higher than in North America. Several options are available as processes for front-end smelting:

- conventional roasting followed by melting/slag fuming;
- two-stage bath smelting: oxidation followed by reduction;
- Outokumpu—or Kivcet-type flash oxidation smelting, with fuming of the high zinc slag;
- direct fuming of zinc from sulphide ores and concentrate;
- direct smelting in a molten copper bath (another type of two stage process);

Except for the direct fuming of zinc from sulphide concentrates, most of the above processes comprise two stages. The two-stage oxidation-reduction processes presume ability to handle a very high zinc slag from the first stage, and this could be a major impediment.

U.S. Pat. No. 5,178,667 discloses a two-stage bath smelting process for making zinc and lead from a sulphide concentrate. In this process, an iron-silicate slag or iron-silicate slag containing lime is formed and the incombustible sulphide concentrate flux and oxygen enriched air are blown into the slag to cause a reaction. As a result of this reaction, the major part of the zinc and part of the lead in the sulphide concentrate are dissolved in the slag. A reducing agent such as heavy oil, pulverized coal, powdered coke, or the like is blown through the resulting slag, and the zinc and the lead in the slag are volatilized, and subsequently condensed to molten zinc and molten lead.

U.S. Pat. No. 5,131,944 discloses another two-stage bath smelting process for making zinc, in which zinc sulphide concentrate is smelted with oxygen to form high zinc slag which flows to the second part of the vessel where it is reduced and volatilized to the gas phase by injection of coal and oxygen; the zinc laden gas is then condensed in a lead splash condenser.

A similar bath smelting process was proposed in U.S. Pat. No. 4,514,221 in which zinc calcine produced from the fluid bed roasting of zinc sulphide concentrate, is injected with coke fines and oxygen into a slag bath where zinc is volatilized and subsequently condensed in a lead splash condenser. The results of a pilot test of 15 tonnes per day showed that the overall zinc recovery is 70% to 74% with a coke consumption of 1.4 to 1.5 tons per ton of metallic zinc produced.

Flash smelting of zinc calcine using coal and oxygen was originally proposed by Kellogg in *Lead-Zinc-Tin '80*, ed Cigan, Mackay and O'Keefe, TMS-AIME, 1979, 28–47, and pilot tested at the Outokumpu Research Centre, Pori, Finland as reported by Asteljoki et al. in *Extractive Metallurgy*, 1989, 3–27. With a coal to calcine ratio of 1.1 to 1.3, they have achieved 89% to 93% zinc volatilization to the gas phase (zinc condensation was not tried during the tests).

A one-step smelting method for zinc sulphide concentrates using air and fossil fuel to produce zinc vapour containing gas which is then condensed in a splash condenser has been proposed by Yazawa in *Metall. Trans. B.*, 1979, 10, 307–321, Davey in Australian Patent No. 59505/90, and Davey and Turnbull in *Proc. of Australia/Japan Extractive Metall. Symp.*, Sydney, Australia, AIMM, July 1990, 23–29. According to these authors, a gas containing about 6% zinc could be produced by flash smelting zinc concentrates at about 1300° C. with pulverized coal or other fossil fuel and air; this zinc vapour, in an $SO_2$ containing gas, would then be condensed in an ISF-type lead splash condenser to produce liquid zinc. Iron, small amount of zinc and other gangue materials will form discard slag with flux. Thermodynamic calculations made by these authors have shown that, under a well controlled oxygen potential (through the control of CO to $CO_2$ ratio), about 95% of zinc in the feed could be volatilized. Because of the low equilibrium partial pressure of zinc at the process temperature, a diluent gas, such as nitrogen, must be introduced to achieve high zinc recoveries to the gas stream. This increases the size of the gas stream to be handled, thereby increasing energy requirements, and capital costs.

Though thermodynamically feasible, there are doubts regarding the practicality of the above proposed process. According to the calculation of Davey and Turnbull identified above, the recovery of zinc is very sensitive to the ratio of oxygen to zinc: a 10% deviation from the optimal value would result in a 40% to 60% decrease in zinc recovery.

Another major difficulty would be the condensation of the zinc from SO2 containing gas due to the tendency for back-reaction of zinc vapour with $SO_2$ gas at lower temperatures.

WO 91/0831 proposes another one-stage bath smelting process for producing metallic zinc. In this process, zinc sulphide concentrate is fed into a slag bath in which a controlled ferric to ferrous ratio is maintained and reacts with ferric iron to form zinc vapour and $SO_2$. Air or oxygen enriched air is injected into the slag bath to oxidize part of ferrous iron to ferric and to burn coal to provide the heat required by the process. The zinc laden gas generated from the slag bath is then shock chilled by a fluid bed heat exchanger to produce metallic zinc. Since the slag temperature is relatively low (1150° to 1300° C.), it is very difficult to control an optimum ferric to ferrous ratio at which zinc vapour is the major reaction product. The difficulty of condensing zinc in the presence of $SO_2$ may also be one of the major problems.

GB 2,048,309 describes a method for recovering nonferrous metal from a sulphide ore thereof. In this method, the ore is dissolved or melted into a molten sulphide carrier composition, such as a copper matte, which circulates in a metal extraction circuit. Thereafter the composition is contacted with oxygen, for instance in a converter, so that at least part of the ore is oxidized. The carrier composition absorbs the heat produced and transmits it to endothermic sites in the circuit. The metal to be extracted can be zinc or a molten sulphidic copper matte composition. The oxidation step converts the copper sulphide of the matte to copper which then is able to reduce the zinc sulphide ore directly into zinc.

It is characteristic of the method described in the previous paragraph that the process employs a reduced pressure vessel for recovery of the volatile materials as a metal or a sulphide thereof, or impurities by means of suction. Because the process is conducted at a reduced pressure, the process temperature is in the range of 1150°-1350° C. The heat required by the endothermic reactions in the contactor and the reduced pressure vessel is obtained by circulating an excessive amount of sulphide matte in the converter. The sulphide matte is heated in the converter or can further be heated with burners. In view of the above description, this process appears rather complex to carry out.

CA 2,096,665 describes a two-stage bath smelting process whereby zinc concentrate is fed along with metallic copper to an electrically heated vessel where copper reacts with zinc sulphide to form zinc vapour and copper matte. The matte is tapped from the primary vessel to a second smelting vessel operating under oxidizing conditions. In this converting operation, metallic copper is regenerated according to well known process chemistry. Waste elements, such as iron, form a disposable slag phase. The zinc laden gas from the primary vessel is collected in a zinc column condenser which allows partial separation of zinc from deleterious elements such as lead and cadmium. The process suffers from several drawbacks, for example (1) high cost due to the necessity of copper matte converting; (2) the formation of sulphur dioxide gas in the converting operation; and (3) requirement of a converter slag cleaning operation to recover copper losses in the slag.

Accordingly, the main drawbacks of the above mentioned pyrometallurgical processes for the extraction of zinc can be summarized as:

difficulty of condensing zinc vapour in the presence of high concentrations of $SO_2$;

undesirable formation of sulphur dioxide and hence the necessity to capture this gas, usually as sulphuric acid;

the inability to treat significant quantities of low grade zinc-iron oxide residues; and the requirement of multiple stages in the processes.

There is therefore a great need to develop a method for smelting complex zinc concentrates and residues which would allow the recovery of zinc of good quality and purity, while simultaneously avoiding any of the above disadvantages. Further, it would be preferable that such method be simple, low cost, and environmentally friendly.

SUMMARY OF THE INVENTION

In accordance with the present invention, there is now provided a process for directly smelting zinc from concentrates or residues. More specifically, the process comprises volatilizing zinc from zinc-containing materials into a gas phase, while sulphur is fixed as iron sulphide in a Fe-S matte. Thereafter, zinc is recovered in metallic form with a suitable condenser apparatus from a zinc laden gas consisting of $Zn(g)$, CO, $CO_2$ and $N_2$. Other metals like silver, cadmium, mercury and lead may also be recovered in this manner.

IN THE DRAWINGS

Figure 3:
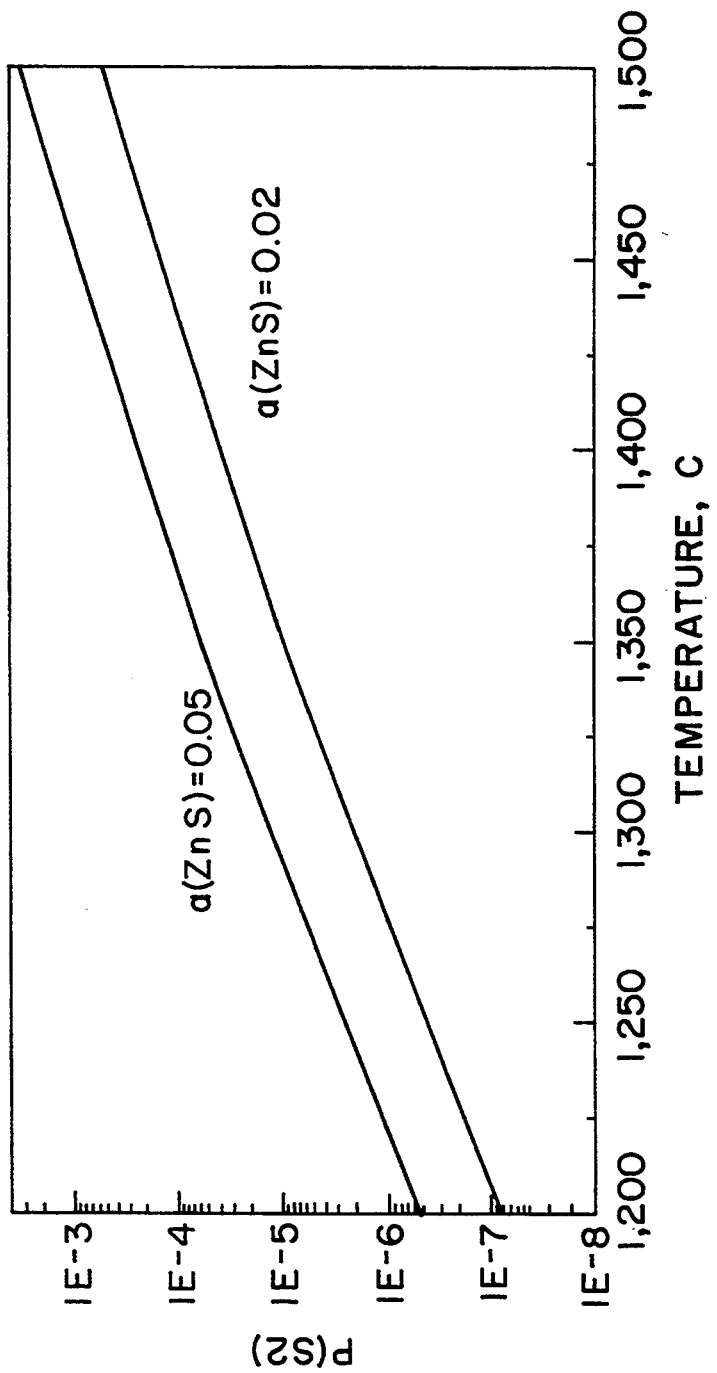

FIG. 3 presents the sulphur partial pressure vs temperature under $P(Zn)=0.1$ atm and $a(ZnS)=0.05$ and 0.02.

Figure 4:
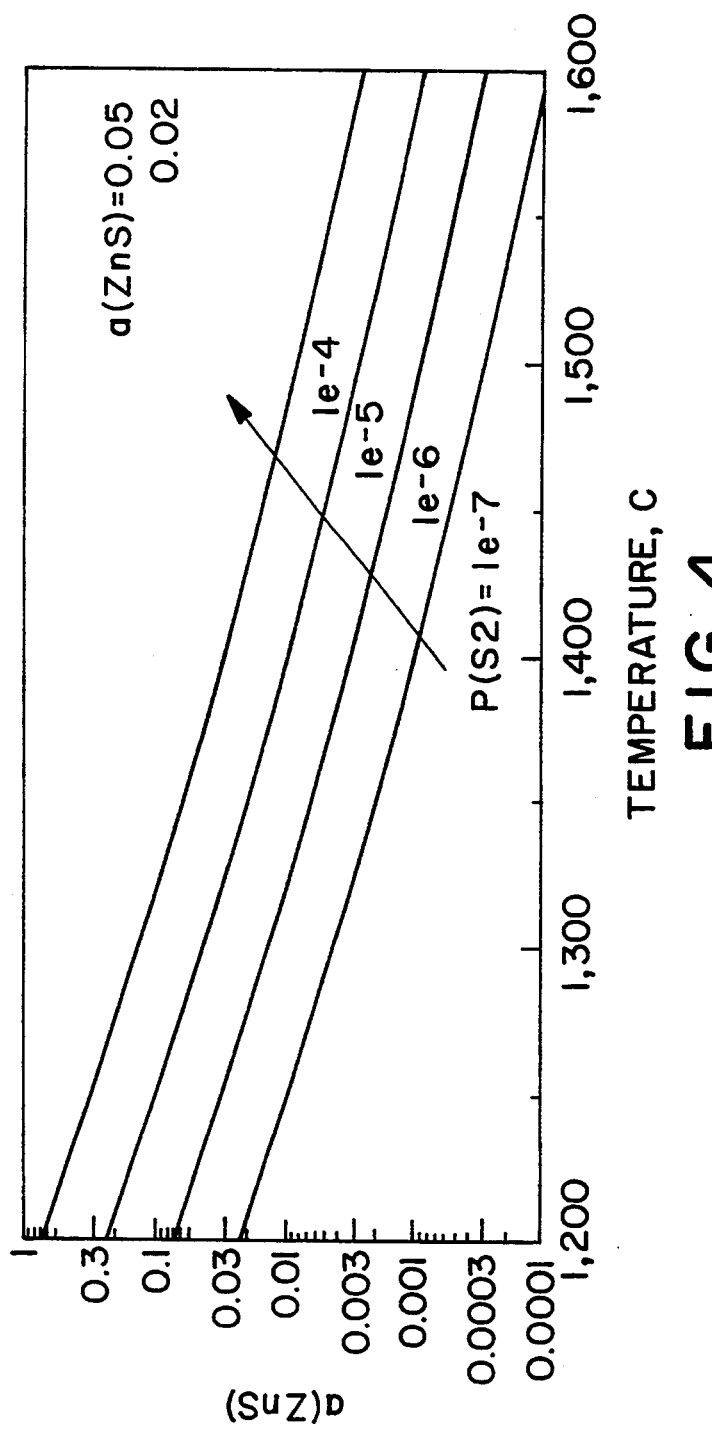
Figure 5:
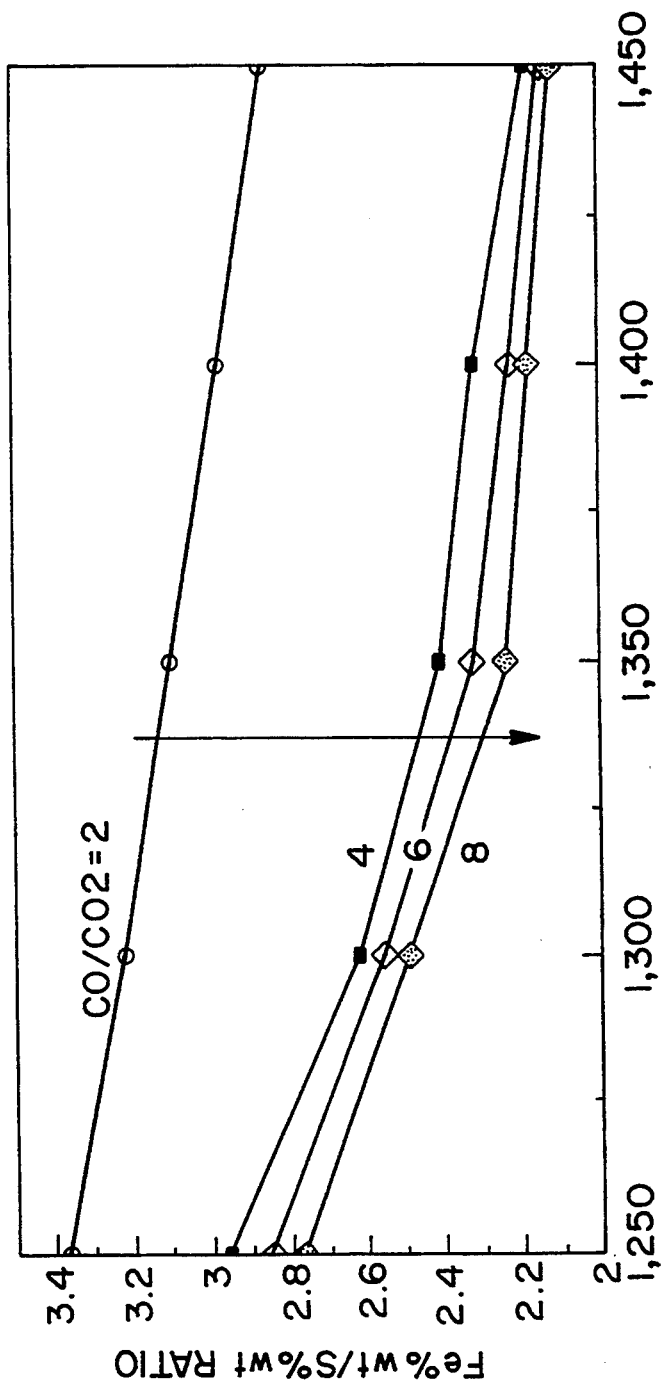
Figure 6:
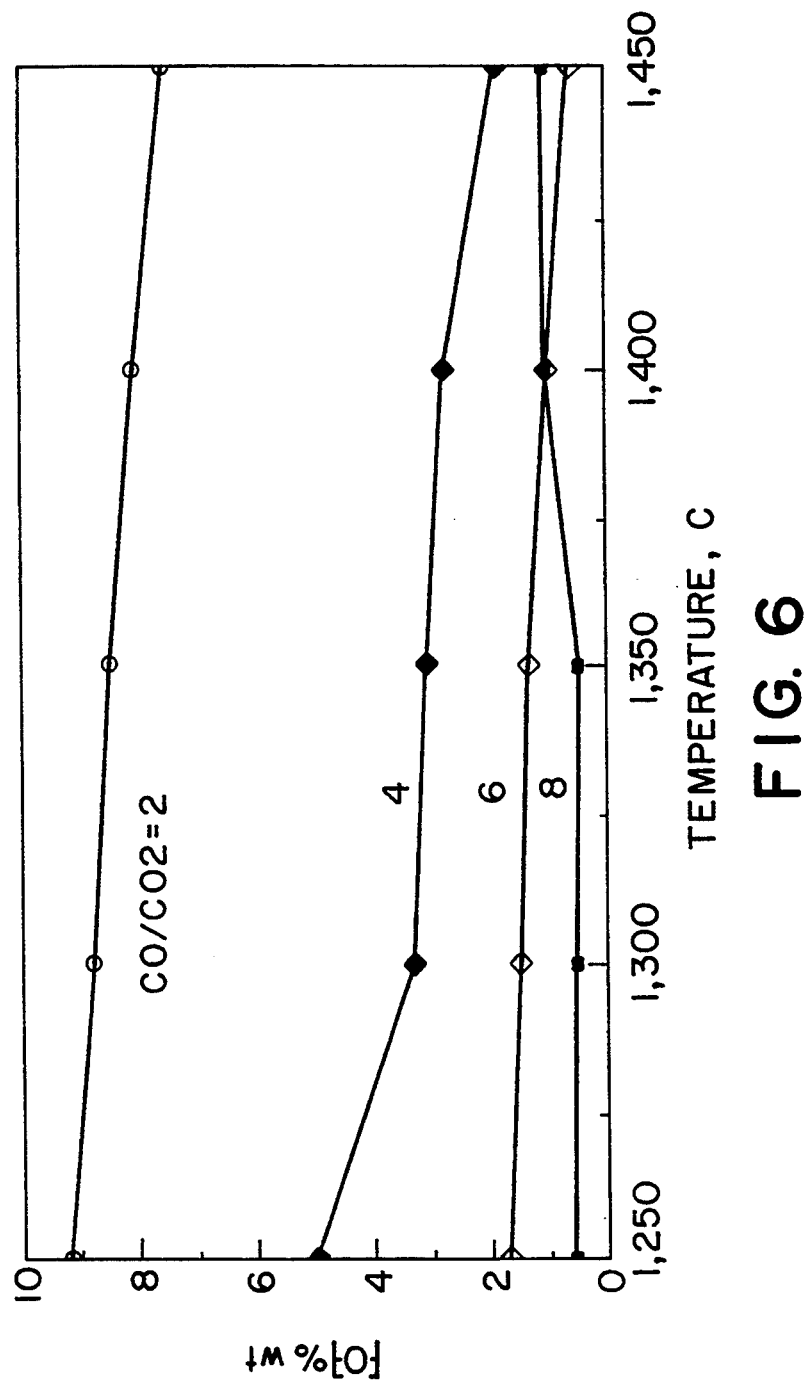

FIG. 4 shows the zinc sulphide activity vs temperature under certain sulphur potential and $P(Zn)=0.1$ atm.

DETAILED DESCRIPTION OF THE INVENTION

The present invention overcomes the problems currently associated with zinc smelting by smelting complex zinc concentrates. It has unexpectedly been found that the presence of an appropriate amount of iron in a molten iron-sulphur bath at a temperature varying from 1200°-1600° C. allow the combination of the reduced iron in the bath with the sulphur in the concentrate, thus allowing zinc vapour to form according to the approximate chemical reaction.

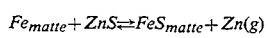

The zinc laden vapour can be condensed in a lead splash condenser to produce a lead-zinc alloy while the iron oxysulphide matte phase, containing low amounts of zinc, can be tapped intermittently from the vessel and disposed of in an environmentally acceptable manner.

If the complex concentrate contains lead, most of it will report to the zinc laden vapour, and will be recovered along with zinc in the lead splash condenser. Other volatile elements such as cadmium will report principally to the vapour phase.

The composition of the iron oxysulphide matte is controlled in a manner such that the zinc has lower solubility in the matte, and the sulphur vapour is present in very low concentration, if ever present, thus avoiding the undesirable back reaction between zinc and sulphur vapour.

The energy required for the process is preferably supplied by either the combustion of carbonaceous fuels or electrical power.

Investigations of zinc sulphide oxidation reactions have revealed the difficulty in recovering zinc metal from a zinc rich vapour phase also containing sulphur dioxide. It has now been found that the process of the present invention has the ability of capturing sulphur while allowing zinc metal vapour to be produced in a $CO/CO_2$ environment. Further, the present process minimizes the amount of $CO_2$ in the process gas, thus reducing the deleterious "back-reaction" of zinc vapour with $CO_2$ according to the following reaction:

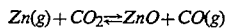
$$Zn(g)+CO_2 \rightleftharpoons ZnO+CO(g)$$

CA 2,096,665 uses metallic copper for collecting sulphur in a molten bath. However, the high value of copper makes regeneration of the metal in a converting operation necessary. Converting adds cost and produces sulphur dioxide which must be treated in an acid plant or costly scrubbing process.

In the process of the present invention, iron metal reacts with sulphur to produce an iron-sulphide matte, while allowing a relatively pure zinc metal vapour phase to form, but with the significant advantage of not producing any sulphur dioxide. Also, the low intrinsic value of iron makes disposal of the iron matte a viable alternative. Further, there exists a great amount of secondary iron-zinc waste materials in the metallurgical industry, such as electric arc furnace dust and zinc leach residue, in which heavy metals such as zinc and lead are present in significant amounts. Great efforts have been made for developing economically viable processes for the treatment of these waste materials. Because the primary purpose of these processes for the treatment of heavy metal containing materials is to produce a disposable non-hazardous material, these processes are environmentally, rather than economically, oriented. However, when secondary iron and zinc materials are used in the present process for the fixation of sulphur, not only zinc and lead can be recovered commercially, but an environmentally safe iron oxysulphide matte is produced simultaneously.

Figure 1:
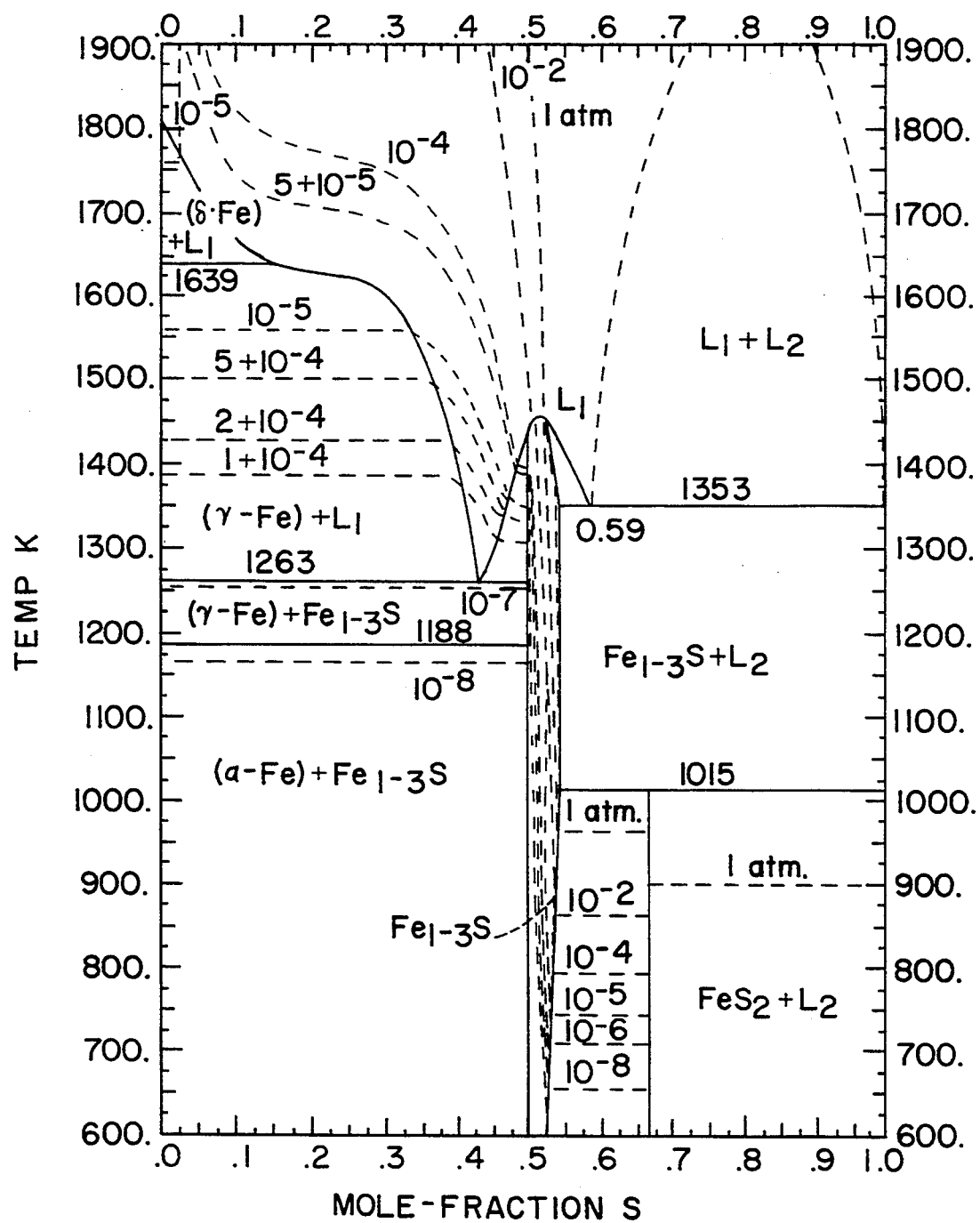
FIG. 1 is the binary phase diagram for the system Fe-S.

FIG. 1 illustrates the binary phase diagram for the system Fe-S with calculated isobar values of $S_2(g)$. The sulphur partial pressure in equilibrium with molten stoichiometric iron sulphide matte is higher than $10^{-2}$ arm depending on the temperature, which is obviously too high to avoid the back reaction:

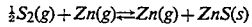
$$\tfrac{1}{2}S_2(g)+Zn(g) \rightleftharpoons Zn(g)+ZnS(s)$$

Fortunately, unlike the copper-sulphur system, the molten iron and iron sulphide are completely miscible and the sulphur potential decreases with increasing iron content in the iron sulphide matte. The sulphur potential can be controlled to any desired level by varying the iron/sulphur ratio in the iron sulphide matte. The iron required for the fixation of sulphur can be in any non-sulphide form, such as scrap iron, iron ore, steel plant dust and even zinc plant leaching residue.

When iron oxides are used, a reductant such as coal, coke and the like, is required to produce the reduced iron. The overall reaction of the direct zinc smelting can be illustrated as follows:

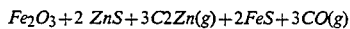
$$Fe_2O_3+2\ ZnS+3C \rightarrow 2Zn(g)+2FeS+3CO(g)$$

The existence of oxygen in the system leads to the formation of a Fe-S-O ternary matte because of the miscibility of iron oxide with iron sulphide. The oxygen content of the Fe-S-O matte depends on the oxygen potential or $CO/CO_2$ ratio.

Figure 2:
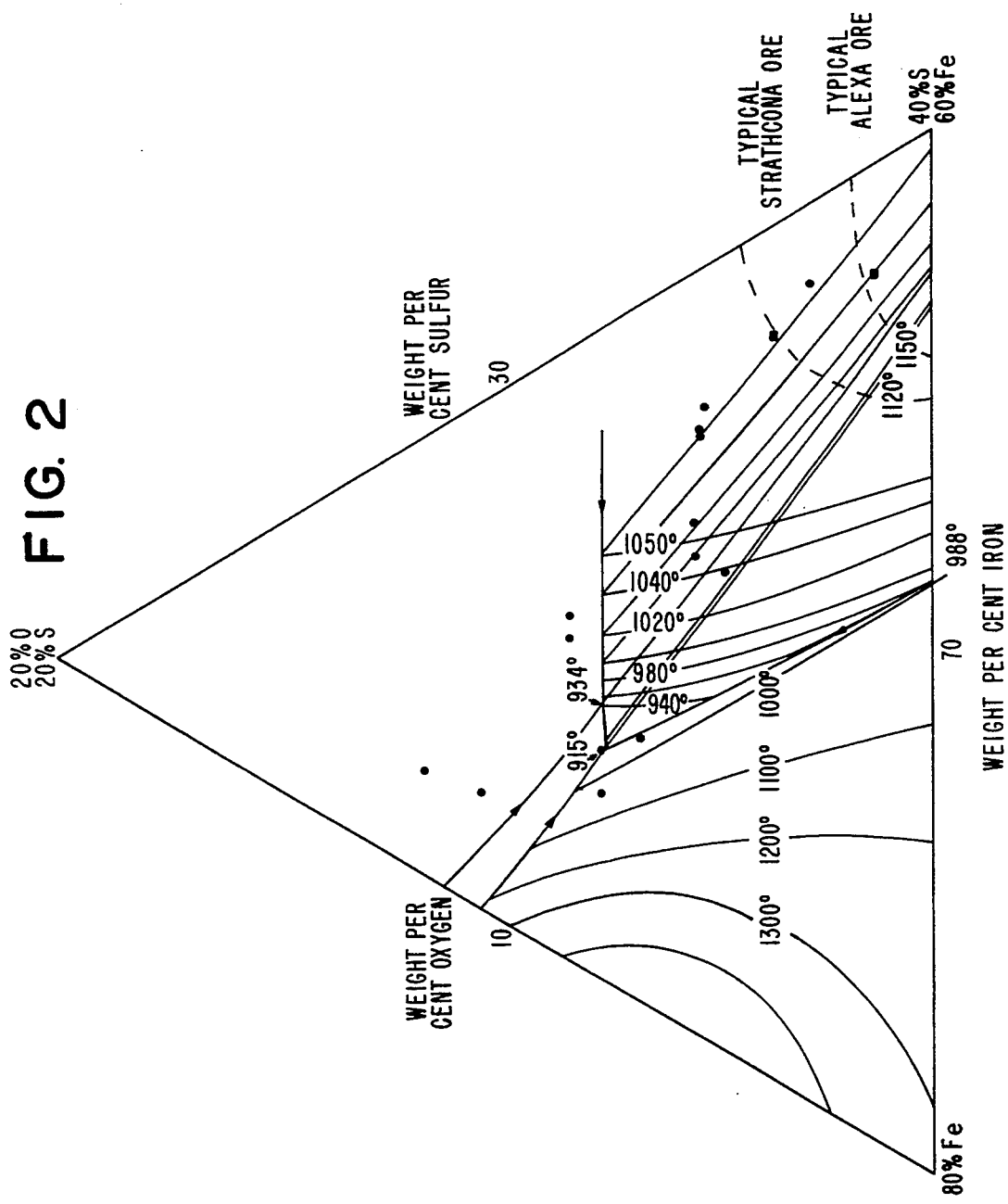
FIG. 2 is the liquidus projection in Fe-S-O system.

FIG. 2 illustrates the phase diagram of a Fe-S-O system. The Fe-S-O matte composition is controlled so that the liquidus temperature is below 1400° C. The solubility of zinc sulphide in the Fe-S-O matte is determined by the reaction:

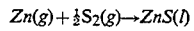
$$Zn(g)+\tfrac{1}{2}S_2(g) \rightarrow ZnS(l)$$

Based on an evaluation of the binary ZnS-FeS phase diagram, the activity coefficient of zinc sulphide in Fe-S-O matte is estimated to be above 5. Activity (ZnS)=0.05 leads to a zinc sulphide solubility in the Fe-S-O matte of less than 1% mole. Assuming that the zinc partial pressure in the zinc laden gas is 10%, i.e., P(Zn)=0.1 atm, the sulphur potential is calculated under a(ZnS)=0.05 and 0.02 and presented in FIG. 3. If the operating temperature is below 1450° C., the sulphur potential is less than $10^{-3}$ arm which is low enough to avoid the back reaction of gaseous zinc with gaseous sulphur.

FIG. 4 shows the ZnS activity versus temperature under certain sulphur potential and P(Zn)=0.1 atm. It can be seen that the zinc sulphide activity decreases with increasing temperature or decreasing sulphur potential. In principle, zinc sulphide solubility in Fe-S-O matte can be controlled to any desired content by either decreasing sulphur potential (increasing iron/sulphur ratio in Fe-S-O matte) or increasing the operation temperature. A problem associated with an extremely low solubility of zinc sulphide in Fe-S-O matte is that the process requires excessive consumption of iron. Further, under constant sulphur potential, a 50° C. increase in temperature leads to a 2 times decrease in zinc sulphide activity.

The Fe-S-O system has three degrees of freedom when the matte is in equilibrium with the gas phase. Therefore, the system is uniquely defined under a set of T, $P(O_2)$ and $P(S_2)$. Assuming that a(ZnS)=0.05 under P(Zn)=0.1 atm is the predetermined operation target, the sulphur potential at a given temperature is calculated on the basis of $Zn(g)+\tfrac{1}{2}S_2(g)=ZnS(1)$ reaction while oxygen potential is a unique function of the $CO/CO_2$ ratio. Furthermore, from the measured thermodynamic properties of Fe-S-O system, the composition of the Fe-S-O matte is determined as a function of temperature under a(ZnS)=0.05, P(Zn)=0.1 atm and a $CO/CO_2$ ratio of from 2 to 8.

From an economic point of view, the Fe/S ratio in Fe-S-O matte should be as low as possible under feasible operating conditions. Fe%wt/S%wt ratio decreases with increasing temperature or $CO/CO_2$ ratio. As the $CO/CO_2$ ratio is increased from 2 to 4, the Fe/S ratio in Fe-S-O matte is decreased from 3.1 to 2.4 at 1350° C. From a thermodynamic point of view, the preferred operating range is a temperature between 1300°–1450° C. and a $CO/CO_2$ ratio in the range 4–8. On the other hand, if the temperature is too high, severe refractory erosion may occur. Thermodynamic analysis has shown that the zinc sulphide solubility decreases about 1.6 times by increasing the temperature of 50° C. under fixed matte composition.

When oxidic iron and reductant coke are used to produce the reduced iron in the Fe-S-O matte, the reduction of $Fe_2O_3$ may take place according to the reactions:

$Fe_2O_3(s) + Fe_{matte} \rightarrow 3\ FeO_{matte}$
$FeO_{matte} + C \rightarrow Fe_{matte} + CO(g)$
$FeO_{matte} + CO(g) \rightarrow Fe_{matte} + CO_2(g)$
$CO_2(g) + C \rightarrow 2\ CO(g)$ The reduction of zinc sulphide and oxide occurs by the following reactions:

$ZnS(s) \rightarrow ZnS_{matte}$
$ZnS(s) + Fe_{matte} \rightarrow Zn(g) + FeS_{matte}$
$ZnS_{matte} + Fe_{matte} \rightarrow Zn(g) + FeS_{matte}$
$NzO(s) \rightarrow ZnO_{matte}$
$ZnO(s) + Fe_{matte} \rightarrow Zn(g) + FeO_{matte}$
$ZnO_{matte} + Fe_{matte} \rightarrow Zn(g) + FeO_{matte}$
$ZnO_{matte} + C \rightarrow Zn(g) + CO(g)$
$ZnO_{matte} + CO(g) \rightarrow Zn(g) + CO_2(g)$ Similar reduction happens for lead, cadmium, mercury and silver. Lead reports to the gas phase as $Pb(g)$ and $PbS(g)$. $Pb(g)$ is recovered as metal while $PbS(g)$ is recovered as dross in the condenser.

Both oxygen and carbon have significant solubility in the iron-rich Fe-S matte, and therefore, carbonaceous fuels can be combusted with air or oxygen enriched air to supply heat for the process. The combustion reaction may take place according to the reactions:

$2\ Fe_{matte} + O_2 \rightarrow 2\ FeO_{matte}$
$C + FeO_{matte} \rightarrow CO(g) + Fe_{matte}$
$FeO_{matte} + CO(g) \rightarrow CO_2(g) + Fe_{matte}$
$C \rightarrow C_{matte}$
$C_{matte} + \frac{1}{2}O_2(g) \rightarrow CO(g)$
$CO(g) + \frac{1}{2}O_2(g) \rightarrow CO_2(g)$ Metallic iron in the Fe-S-O matte acts as a media for the reaction of carbon and oxygen, which makes it possible to supply heat by the combustion of carbonaceous fuels in the present process. In contrast, in the absence of a slag phase, carbon cannot be readily combusted in either copper or copper matte because of the lack of oxygen and carbon solubility in molten copper or copper matte.

It is possible that the solid feed materials may contain significant mount of gangue such as $SiO_2$, $CaO$, $MgO$ and $Al_2O_3$. Because of the low solubility of these gangue constituents in the Fe-S-O matte, a fluid slag phase must be formed. This can be done by adding some flux, for example lime. It is however preferred for the present process to minimize the production of a slag phase in order to reduce zinc losses in the form of zinc oxide to the slag.

The following examples are provided to illustrate the method of the present invention rather than limiting its scope. All the percentages are by weight unless indicated otherwise.

EXAMPLE 1

5 kg of artificial Fe-S-O matte having a composition of 27.7%S, 3.5% O and 68.8% Fe was placed in a 12 cm I.D. graphite crucible and heated in an induction furnace up to a temperature range of 1300° C. to 1450° C. 50 g/min of premixed feed materials consisting of 56% zinc concentrate (assaying 51% Zn, 33% S, 10% Fe and 1.6% Pb), 35.6% metallic iron powder and 8% $Fe_2O_3$, together with 20 NL/min of nitrogen, were injected into the molten bath through a submerged 0.95 cm ($\frac{3}{8}''$) I.D. mullite ceramic lance. A water cooled steel jacket was inserted into the free space of the crucible to quench the volatilized zinc from the gas stream. Condensed samples from the gas stream were assayed for zinc, sulphur, oxygen, cadmium, lead, and iron. Samples of the matte were also taken prior to, during and after the test to detect the zinc solubility in the matte. Each test was carried out for 2-3 hours continuously. Tables 1 and 2 summarize the typical results of the tests.

TABLE 1

| Chemical assay of the Fe—S—O matte (in weight) | | | | | | | |
|---|---|---|---|---|---|---|---|
| T (°C.) | Fe % | S % | O % | $SiO_2$ | Zn % | Cd % | Pb % |
| 1300° C. | 68 | | | | 1 | 5 ppm | 0.1 |
| 1350° C. | 68 | 28 | 3 | <0.5 | 0.8 | 3 ppm | 0.1 |
| 1400° C. | 68 | | | | 0.5 | 3 ppm | 0.1 |

TABLE 2

| Typical chemical assay of condensed samples (in weight) | | | | | | |
|---|---|---|---|---|---|---|
| Fe | S % | O % | $SiO_2$ | Zn % | Cd % | Pb % |
| 100 ppm | 0.1-2% | n.a. | n.a. | 98-100 | 0.1-0.3 | 1-3 |

A mass balance shows the concentration of zinc in the zinc laden gas to be about 20% vol. If the partial pressure was kept at 0.1 atm, the solubility of zinc sulphide is expected to be reduced twice. This assumption was confirmed by tests at a fixed temperature of 1350° C. with variable nitrogen flow rates. Results are provided in Table 3.

TABLE 3

| Chemical assay of the Fe—S—O matte (in weight) | | | | | |
|---|---|---|---|---|---|
| $Q(N_2)$ NL/min | Fe % | S % | O % | $SiO_2$ | Zn % |
| 10.00 | | | | | 1.1 |
| 20.00 | 68 | 28 | 3 | <0.5 | 0.8 |
| 40.00 | | | | | 0.45 |

EXAMPLE 2

The procedure of Example 1 wherein metallic iron is the reductant for zinc sulphide was repeated using the same apparatus, but with other feed materials, which consisted of 44% zinc concentrate, 47% iron ore and 9% coke. Iron ore with the assay 67.6% Fe (as $Fe_2O_3$), 1-2% $SiO_2$, 1.0% CaO and 1% MgO, fine coke with 95% fixed carbon was used to produce the reduced iron needed to react with zinc sulphide. Tests were carried out at temperatures between 1300° to 1400° C. The feed rate of the solid mixture was varied between 50-80 g/min. Nitrogen gas was used to inject the feeding material and to dilute the gas. The results of the tests are shown in Table 4. The assay of the condensed sample is similar to that shown in Table 2.

TABLE 4

| T (°C.) | Estimated P(Zn) | Fe % | S % | O % | SiO₂ % | Zn % | Cd % | Pb % |
|---|---|---|---|---|---|---|---|---|
| 1300° C. | 0.2 | | | | | 0.9 | | |
| 1350° C. | 0.2 | 69 | 27 | 3 | <0.5 | 0.5 | 5–7 ppm | 0 |
| 1400° C. | 0.2 | | | | | 0.3 | | |

Chemical assay of the Fe—S—O matte (in weight)

The second phase tests showed that oxidic iron, together with carbon, can be used successfully to fix sulphur, thus producing a sulphur free zinc laden gas. This confirms the concept of using secondary iron materials as the iron source for the fixation of sulphur.

EXAMPLE 3

This example illustrates the tests for recovering oxidic zinc from secondary zinc and iron materials. For test purposes, pure zinc oxide was used instead of a commercial secondary zinc material. 22 g/rain of a solid mixture of 87% ZnO and 13% coke was injected along with 20 NL/min nitrogen into a Fe-S-O matte having a composition of 68.8% Fe, 27.7% S and 3.5% O. The reaction occurred at 1350° C. Tables 5 and 6 shows the results.

TABLE 5

Chemical assay of the Fe—S—O matte (in weight)

| T (°C.) | Fe % | S % | O % | SiO₂ | Zn % | Cd % | Pb % |
|---|---|---|---|---|---|---|---|
| 1350° C. | 70 | 27 | 2 | <0.5 | 0.9 | 2 ppm | 0.2 |

TABLE 6

Typical chemical assay of condensed samples (in weight)

| Fe | S % | O % | SiO₂ | Zn % | Cd % | Pb % |
|---|---|---|---|---|---|---|
| 100 ppm | 0.2 | n.a. | n.a. | 98–100 | 0.1–0.3 | 0.9 |

EXAMPLE 4

This example illustrates the concept of replacing nitrogen with air in order to generate the heat through coke combustion. 43 g/min solid mixture consisting of 42.8% iron ore, 43.6% zinc concentrate and 13.6% coke was injected along with 6.4 NUmin air into a Fe-S-O matte with the composition 68.8% Fe, 27.7% S and 3.5% 0. Reaction took place at 1350° C. Sulphur dioxide and the CO/CO₂ ratio were monitored during the test. It was found that the sulphur dioxide concentration in zinc laden gas was less than 100 ppm. This confirms the process concept of using air. Table 7 shows the final matte composition. The condensed zinc assay is the same as those in the above examples.

TABLE 7

Chemical assay of the Fe—S—O matte (in weight)

| T (°C.) | Fe % | S % | O % | SiO₂ | Zn % |
|---|---|---|---|---|---|
| 1350° C. | 67 | 26 | 3 | <0.5 | 0.5 |

As stated above, a significant advantage of the process of the present invention is the elimination of sulphur dioxide generation and the associated cost of sulphuric acid production. Sulphur is captured in the Fe-S-O matte which may be tapped from the smelting vessel for disposal.

It is important for the viability of the process to generate a waste material with adequate environmental stability over a long term. The extraction of heavy metal elements from the Fe-S or Fe-S-O matte produced in the laboratory has been tested using standard environmental protocols. Test results using slowly-cooled matte samples show minimal extraction of major heavy metals such that the material does not fall under the category of a hazardous waste material. Rapid cooling of the liquid matte in a water quench further improves the stability of the material by forming a glass phase. Therefore, it is obvious that the preferred form of the present process would incorporate a rapid matte cooling step as a means to enhance environmental stability of the product material.

While the invention has been described in connection with specific embodiments thereof, it will be understood that it is capable of further modifications and this application is intended to cover any variations, uses or adaptations of the invention following, in general, the principles of the invention and including such departures from the present disclosure as come within known or customary practice within the art to which the invention pertains, and as may be applied to the essential features hereinbefore set forth, and as follows in the scope of the appended claims.

What is claimed is:

1. A pyrometallurgical process for the direct smelting of zinc, comprising the steps:

feeding zinc-containing material and sulphur-containing material, or feeding a material containing at least zinc and sulphur, or feeding mixtures thereof in a furnace containing a molten Fe-S matte while maintaining a temperature of from 1200° to 1600° C.;

feeding an iron-containing material to fix sulphur in an amount sufficient to maintain the Fe/S ratio in the matte above 1.8;

feeding an inert gas or an oxygen-containing gas into the matte to cause zinc to vaporize in a substantially pure form; and recovering the substantially pure zinc through a condenser.

2. A process according to claim 1, wherein the matte further comprises oxygen to form a Fe-S-O matte.

3. A process according to claim 1 wherein the material containing at least zinc and sulphur is a sulphide ore and the zinc-containing material is zinc-iron residues.

4. A process according to claim 3 wherein the sulphide ore is a zinc concentrate or a zinc complex concentrate.

5. A process according to claim 1 wherein the iron in the matte is from pure iron, scrap iron, iron ore, ferrosilicon alloy or residue, high temperature treated iron containing electrolytic zinc residue or iron and steel plant dust.

6. A process according to claim 1 wherein the partial pressure of zinc in zinc laden gas does not exceed 1 atm.

7. A process according to claim 1 wherein a flux is added to the matte to form a slag if gangue is present in the zinc-containing feed.

8. A process according to claim 9 wherein the flux is lime.

9. A process according to claim 2 wherein the oxygen content in the matte does not exceed 10%.

10. A process according to claim 2 wherein a reductant is added to the matte.

11. A process according to claim 10 wherein the reductant is a solid carbonaceous material.

12. A process according to claim 11 wherein the solid carbonaceous material is coal or coke.

13. A process according to claim 11 wherein $CO/CO_2$ ratio in the laden zinc gas is at least 2.

14. A process according to claim 1 wherein the matte is cooled rapidly after recovering substantially all the zinc, to promote the formation of a glassy structure having enhanced stability.

15. A process according to claim 10 wherein oxidized zinc, lead, cadmium, mercury and silver which may be present in the zinc-containing material or in the material containing at least zinc and sulphur are also reduced to metallic vapour form by the reductant and the reduced metallic vapours are recovered separately.

16. A process according to claim 1, wherein heat is supplied by the combustion of carbonaceous fuels or electrical power.

17. A process according to claim 1, wherein the inert gas is nitrogen and the oxygen containing gas is air, oxygen enriched air or pure oxygen.

18. A process according to claim 1 wherein the zinc-containing material is pretreated in a high temperature furnace to remove moisture and halogens which may be present therein.

19. A process according to claim 13, wherein the temperature of the furnace is 1350° C.; the $CO/CO_2$ ratio is 4–6; the Fe/S ratio (by weight) is about 2.3 and the 0% is about 2.5% wt in the matte.

* * * * *